(12) United States Patent
Fink et al.

(10) Patent No.: US 9,721,035 B2
(45) Date of Patent: Aug. 1, 2017

(54) SYSTEMS AND METHODS FOR RECOMMENDED CONTENT PLATFORM

(75) Inventors: Kevin Fink, Carnation, WA (US); Todd Otis, Kenmore, WA (US)

(73) Assignee: LEAF GROUP LTD., Santa Monica, CA (US)

( * ) Notice: Subject to any disclaimer, the term of this patent is extended or adjusted under 35 U.S.C. 154(b) by 99 days.

(21) Appl. No.: 13/285,874

(22) Filed: Oct. 31, 2011

(65) Prior Publication Data

US 2013/0036191 A1 Feb. 7, 2013

Related U.S. Application Data

(60) Provisional application No. 61/514,025, filed on Aug. 1, 2011.

(51) Int. Cl.
*G06F 15/16* (2006.01)
*G06F 17/30* (2006.01)

(52) U.S. Cl.
CPC ............... *G06F 17/30905* (2013.01)

(58) Field of Classification Search
CPC ......... G06F 17/30867; G06F 17/30752; G06F 17/30035; H04N 21/25891; H04N 21/2393
USPC ....................................................... 709/217
See application file for complete search history.

(56) References Cited

U.S. PATENT DOCUMENTS

| | | | |
|---|---|---|---|
| 6,757,691 B1 | 6/2004 | Welsh et al. | |
| 7,080,138 B1 * | 7/2006 | Baker et al. | 709/224 |
| 7,720,723 B2 * | 5/2010 | Dicker | G06Q 30/02 705/14.51 |
| 8,856,331 B2 | 10/2014 | Coyer et al. | |
| 2002/0092019 A1 | 7/2002 | Marcus | |
| 2002/0144268 A1 * | 10/2002 | Khoo | G06Q 30/02 725/47 |
| 2003/0182308 A1 * | 9/2003 | Ernst et al. | 707/103 Z |
| 2004/0093327 A1 * | 5/2004 | Anderson et al. | 707/3 |
| 2004/0205593 A1 * | 10/2004 | Kraemer | 715/513 |
| 2005/0065847 A1 | 3/2005 | Feeley et al. | |
| 2005/0076061 A1 | 4/2005 | Cox | |
| 2005/0177358 A1 * | 8/2005 | Melomed et al. | 704/2 |
| 2007/0100698 A1 | 5/2007 | Neiman et al. | |
| 2007/0266031 A1 * | 11/2007 | Adams | G06F 17/30286 |
| 2008/0071929 A1 | 3/2008 | Motte et al. | |
| 2008/0168032 A1 * | 7/2008 | Criou et al. | 707/3 |
| 2009/0198580 A1 | 8/2009 | Broberg et al. | |
| 2009/0265340 A1 * | 10/2009 | Barcklay et al. | 707/5 |

(Continued)

FOREIGN PATENT DOCUMENTS

WO  WO 2010111964  * 10/2010

*Primary Examiner* — Shean Tokuta
(74) *Attorney, Agent, or Firm* — Greenberg Traurig, LLP

(57) ABSTRACT

Systems and methods for presentation of content, or a title or link to content or presentation to a user on webpages of a website are provided. In one embodiment, a recommended content platform optimizes the links displayed on web pages based on a portfolio of content sources which determine which links are displayed in a given page view. The algorithms may or may not utilize data relating to user interaction with webpages and may produce different sets of links depending on the content of a webpage and a position on a webpage where the links are to be displayed. A given webpage may present links from multiple content sources displayed using multiple user interface elements distributed throughout the webpage.

17 Claims, 6 Drawing Sheets

(56) References Cited

U.S. PATENT DOCUMENTS

| | | |
|---|---|---|
| 2009/0327488 A1 | 12/2009 | Sampat et al. |
| 2010/0010865 A1 | 1/2010 | Dyer |
| 2010/0041419 A1* | 2/2010 | Svendsen et al. ......... 455/456.3 |
| 2010/0049796 A1* | 2/2010 | Kawamura et al. .......... 709/203 |
| 2010/0138443 A1* | 6/2010 | Ramakrishnan et al. .... 707/769 |
| 2010/0146144 A1 | 6/2010 | Audenaert et al. |
| 2010/0153518 A1 | 6/2010 | Kitts |
| 2010/0223125 A1* | 9/2010 | Spitkovsky ............ G06Q 30/02 705/14.42 |
| 2010/0278425 A1* | 11/2010 | Takemoto et al. ............ 382/173 |
| 2011/0055718 A1* | 3/2011 | Tanaka et al. ................ 715/747 |
| 2011/0161847 A1 | 6/2011 | Chaikin et al. |
| 2011/0264736 A1* | 10/2011 | Zuckerberg et al. ......... 709/204 |
| 2011/0302145 A1* | 12/2011 | Brown et al. .................. 707/706 |
| 2012/0030014 A1 | 2/2012 | Brunsman et al. |
| 2012/0030015 A1 | 2/2012 | Brunsman et al. |
| 2012/0167010 A1* | 6/2012 | Campbell et al. ............ 715/825 |
| 2013/0031450 A1 | 1/2013 | Reese |
| 2013/0031465 A1 | 1/2013 | Yehaskel |
| 2013/0198007 A1* | 8/2013 | Selinger et al. ........... 705/14.66 |

* cited by examiner

SYSTEMS AND METHODS FOR RECOMMENDED CONTENT PLATFORM

CROSS-REFERENCE TO RELATED APPLICATIONS

This application claims priority to U.S. Provisional Application No. 61/514,025 entitled "SYSTEMS AND METHODS FOR RECOMMENDED CONTENT PLATFORM," filed Aug. 1, 2011, which is hereby incorporated by reference in its entirety. This application is related to U.S. patent application Ser. No. 12/828,200, filed Jun. 30, 2010, entitled "RULE-BASED SYSTEM AND METHOD TO ASSOCIATE ATTRIBUTES TO TEXT STRINGS," by Yehaskel, et al., and is also related to U.S. patent application Ser. No. 12/877,935, filed Sep. 8, 2010, entitled "SYSTEMS AND METHODS FOR KEYWORD ANALYZER," by Yehaskel, et al., the entire contents of which applications are incorporated by reference as if fully set forth herein.

FIELD OF THE TECHNOLOGY

At least some embodiments disclosed herein relate to computer or data processing systems in general, and more particularly, but not limited to, presentation (to a user of a computing device) of content, or a title or link to content.

BACKGROUND

Websites employ several means to bring visitors to the websites. They may advertise, get listed in search engines and directories, and otherwise promote their website. Once a website has attracted a visitor to the website, the website is often operated to try to get the visitor to stay on the site and consume more Internet content. This may involve offering the visitor a choice of additional, recommended content to consume. Such content may relate to the content of the website, to content of special interest to the website visitor or may simply be of general interest.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
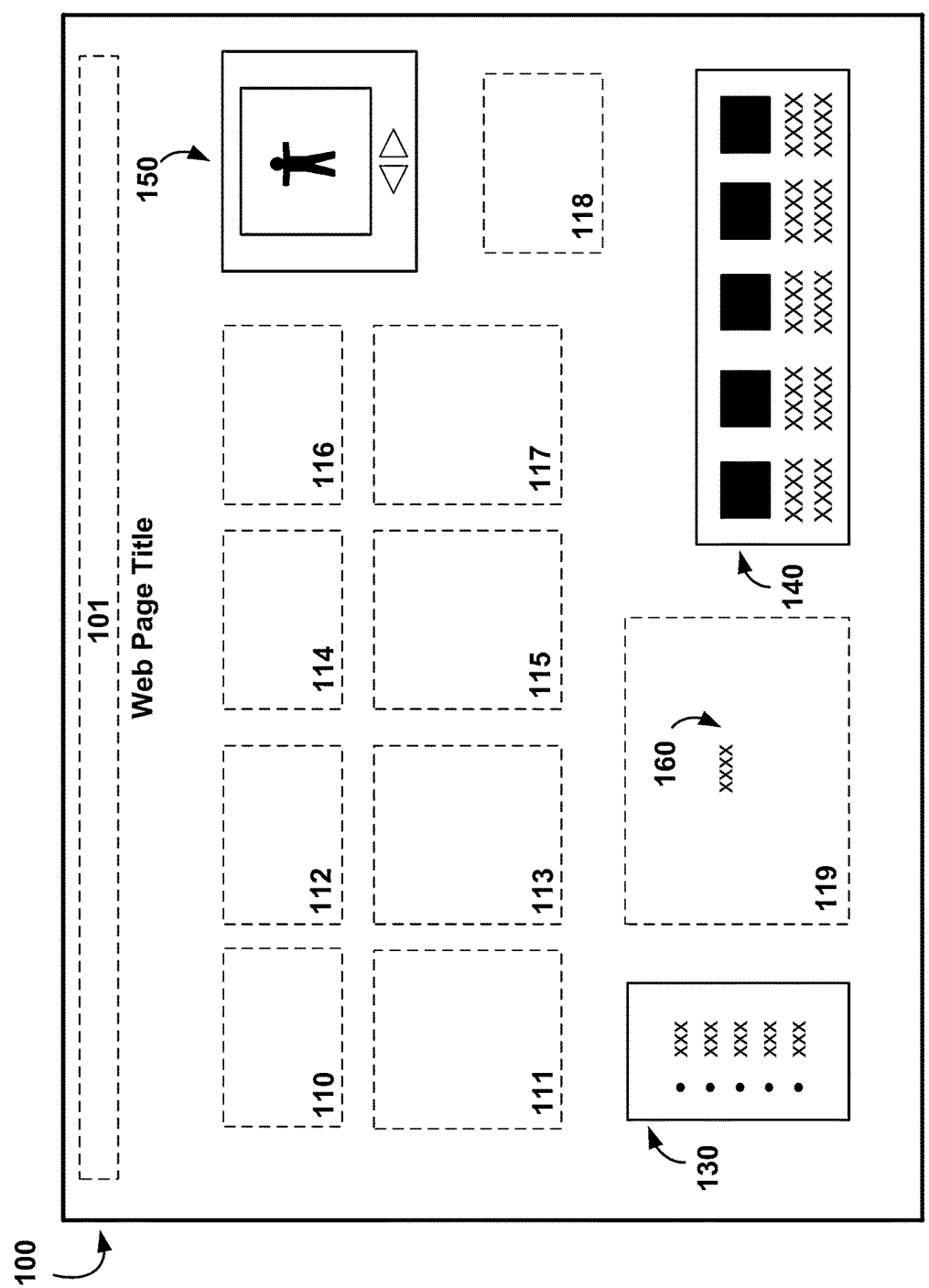
FIG. 1 illustrates an exemplary webpage that utilizes a recommended content platform to display a variety of links relevant to, for example, the page content, the viewing user or users in general.

The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

For the purposes of this disclosure, "content" or "online content" should be understood to refer to various types of digital objects accessible over the Internet embodying the expression of one or more concepts that may be of interest to users. In one embodiment, content may take the form of text articles, such as news articles or topical articles relating to one or more topics. In one embodiment, content may take the form of multimedia objects, such as images, audio presentations, and audiovisual presentations relating to one or more topics.

For the purposes of this disclosure, "title" should be understood to represent a single sentence that could serve as a title for online content. Typically, a title conveys a single concept in a concise way that allows users to readily identify the nature of online content to which such titles are attached.

For the purposes of this disclosure, "algorithm" should be understood to generally refer to a method for inputting and processing data to produce a desired output. The method can include, without limitation a specification of data sources and data types input to the method, selection of subsets of input data, translation and transformation of input data, calculations using input data and possibly external reference data, aggregation of input data, output of results in one or more formats and/or the ordering of output data.

For the purposes of this disclosure, "link" should be understood to generally refer to data referring to content accessible, over a network, on one or more servers or other computing devices that includes, inter alia, sufficient information to access the content. Links typically include a URL or other type of URI that provides a name and a logical network path to a digital object embodying the content. More generally, however, "link" should also be understood to potentially include data that describes the content as well, which could include, without limitation, a title, an abstract or keywords that describe the content. In the present disclosure, where reference is made to a "link," it should be understood that the link includes a URI of some form that allows a user to access the content to which it refers, but could, in various embodiments, also comprise data that describes the content to which the URI refers. Where links are "displayed," it should be understood that the URI for the content and potentially any (or none) of data that describes the content to which the URI refers is displayed. It should also be understood that where a link is displayed, unless otherwise specified, the link will be user selectable to access the content to which the link refers.

For the purposes of this disclosure, "recommended content" should be understood to refer to content where, in one embodiment, it has been determined that a particular user, group of users or users in general have a potential interest in the content, and thus, the content can be "recommended" to such users for consumption. Such determination may be based on any methodology that tends to distinguish the recommended content from all content in general. As described below, one method of recommending content to users is through the application of content recommendation algorithms to available content. In other embodiments, recommendations may also be based, in whole or in part, on factors unrelated to the content or users. For example, recommendations may be made or weighted towards content items that have a higher effective pay-per-click (PPC), or are part of a class of content to which traffic is directed for a variety of reasons such as, for example, campaign fulfillment.

System Overview

Systems and methods for presentation of content, or a title or link to content (for presentation to a user) are described herein. In one embodiment, the recommended content platform (RCP) disclosed herein optimizes the links displayed on web pages based on a portfolio of content recommendation algorithms which determine which links are displayed in a given page view.

FIG. 1 illustrates an exemplary webpage 100 that utilizes an RCP to display a variety of links relevant to, for example, the page content, the viewing user or users in general.

The webpage 100 shown is a conventionally formatted webpage, having a title bar 110 and various content items 110-119. The content items 110-119 could be any type of content embedded in webpages such as, for example, text, images, multimedia objects and so forth. In one embodiment, the systems displaying the webpage may identify recommended content that relates to, for example, the page content, the viewing user or users in general. In one embodiment, the recommended content is identified by an RCP as described herein in detail. In one embodiment, as shown in FIG. 1, links for recommended content in a given page view can be presented via multiple user interface elements 130, 140, 150 and 160 positioned at any location within the webpage.

In one embodiment, links for recommended content can be displayed using any type of user interface element known in the art, such as, for example, simple lists of text 130, horizontal or vertical bars 140 containing thumbnail images, authors, and abstracts, scrollable slide shows 150 and/or arbitrary in-text phrases 160. In one embodiment, each user interface element 130, 140, 150 and 160 could display the same set of links, or could display different links, as described in detail below.

Figure 2:
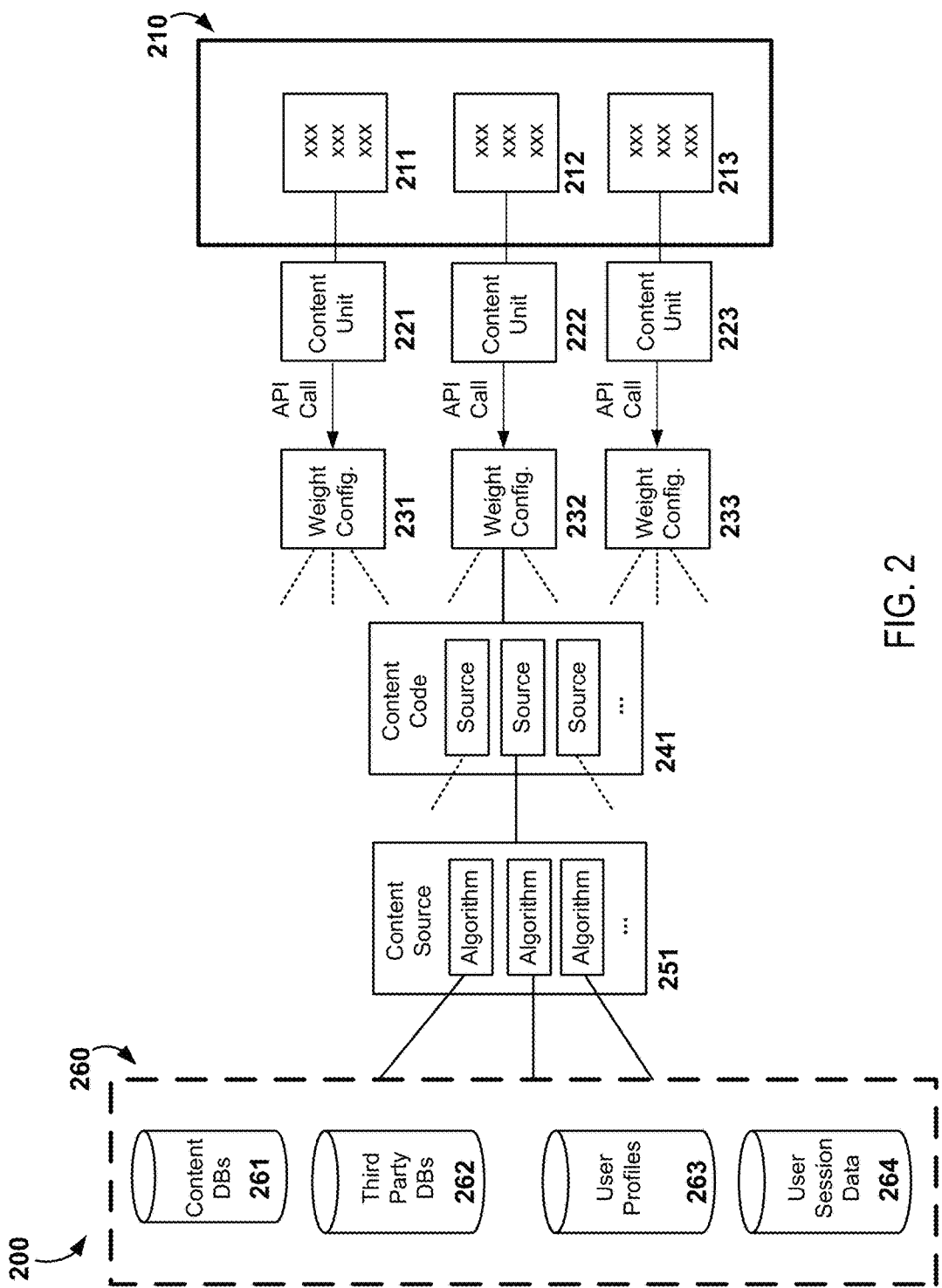
FIG. 2 illustrates a conceptual overview of one embodiment of a structure of elements used to present recommended content platform supplied links to a user via a webpage.

FIG. 2 illustrates a conceptual overview of one embodiment of a structure 200 of elements used to present RCP supplied links to recommended content to a user via a webpage 210.

In the illustrated embodiment, the webpage 210 has three user interface elements, 211, 212 and 213 that display links to recommended content supplied by an RCP. The webpage 210 could contain any type of content (not shown). In one embodiment, the user interface elements could present links in any format, such as the formats discussed above with reference to FIG. 1. In one embodiment, each user interface element 211, 212 and 213 could display the same set of links, or could display different links.

In one embodiment, each of the user interface elements, 211-213 is associated with a corresponding content unit 221-223. In one embodiment, each content unit 231-233 specifies, inter alia, the format of its corresponding user interface element (e.g. list, slideshow, embedded text) and the position of the user interface element on the webpage. In one embodiment, each content unit is further associated with a content unit name. In one embodiment, the content unit name is used, in combination with additional data such as the webpage name and a webpage category, to look up a weight configuration 241 via an API call. In one embodiment, the weight configuration specifies a list of content codes 241 and weighs associated with each of the content codes. In one embodiment, each of the content codes 241 specify an ordered list of one or more content sources 251 with associated metadata (maximum number of links, whether a source is mandatory or optional, and so forth).

In one embodiment, each of the content sources 251 specifies, inter alia, a methodology of how links to recommended content are to be obtained. In one embodiment, links to recommended content can be obtained from an RCP via content sources provided by the RCP. In the illustrated embodiment, each content source 251 is shown associated with a single, specific corresponding content code 241, although it should be understood that, in various embodiments, content sources 251 are independent of content codes 241.

In one embodiment, each content source 251 is associated with one or more content recommendation algorithms. In one embodiment, each content recommendation algorithm defines a method for identifying links to recommended content from various data sources 260. Such data sources could include content databases and indexes 261 maintained by an RCP provider, third-party databases and indexes 262 maintained by third parties (including third-party content websites and social networking websites), user profile data 263 maintained by the RCP and session data 264 logged by the RCP. Content sources and content recommendation algorithms are discussed in detail below under the section labeled "Content Sources" and "Content Recommendation Algorithms" respectively.

Widget-Based Implementation

Figure 3:
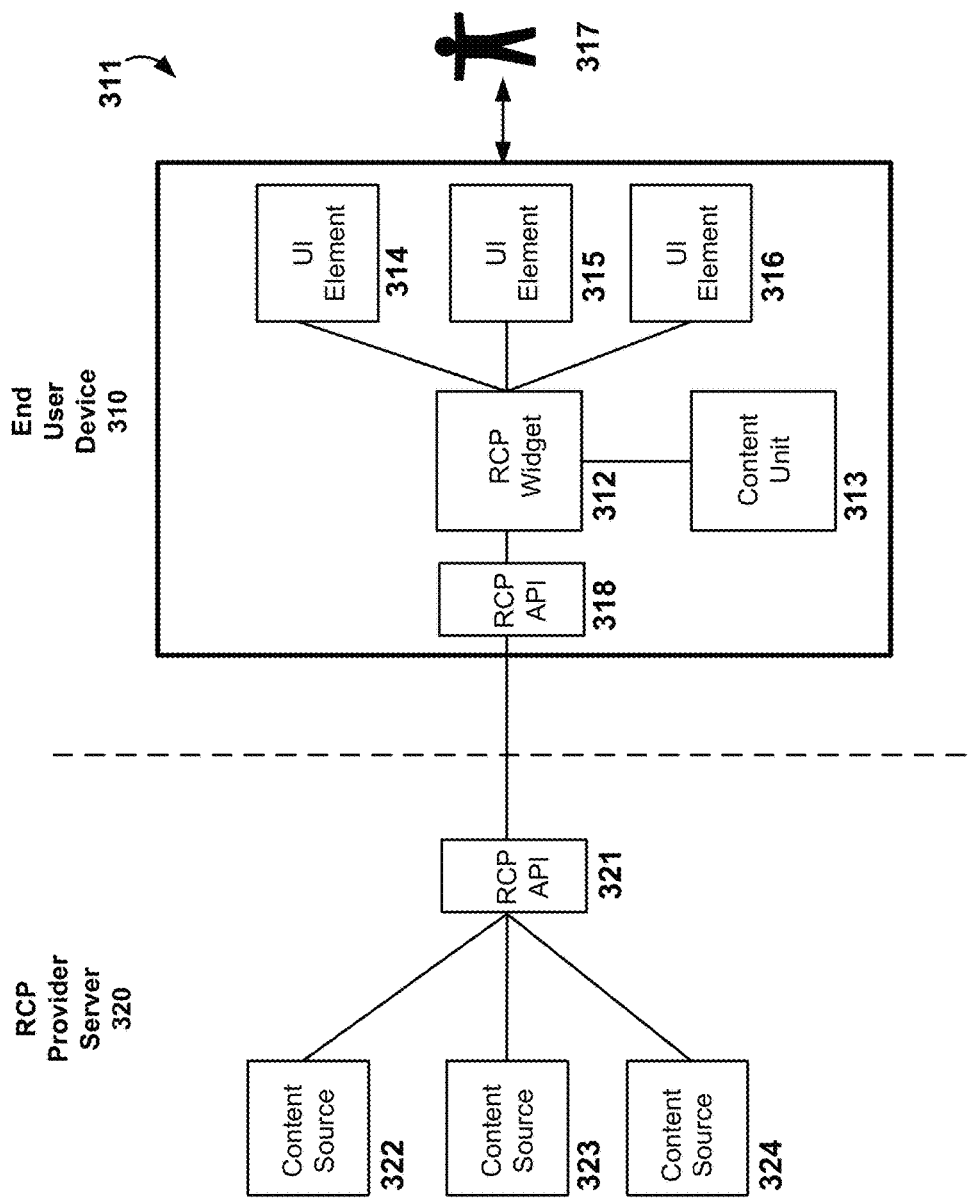
FIG. 3 illustrates one embodiment of the presentation of links for recommended content to a user using a widget-based implementation of an interface to a recommended content platform.

FIG. 3 illustrates one embodiment of the presentation of links for recommended content to a user using a widget-based implementation of an interface to an RCP.

Assume the owner of a website wishes to present three sets of links to recommended content on various positions of a webpage 311 to a user 317. The website serves a webpage 311 to a user device 310. A single RCP widget (or other similar executable webpage component) 312 is included on the webpage 311, which provides facilities to, inter alia, obtain links to recommended content from an RCP and display such links on the webpage 311. The widget could be implemented using any techniques known in the art for widget implementation, for example as a JAVASCRIPT widget. The webpage additionally includes content units 313 for at least three user interface elements 314-316 which are to be generated and/or populated with links to recommended content to be displayed on the webpage 311.

In one embodiment, the content units 313 define the format and position of each of the user interface elements 314-316 on the webpage and additionally are associated with a content unit name used by the RCP widget 312 in API calls to the RCP service providers servers 320. In one embodiment, the content units 313 refer to existing user interface elements implemented via separate widgets.

In one embodiment, when the end-user device displays the webpage 311 on the end-user device, the RCP widget 313 references the content units 313 and identifies the names of such content units. The RCP widget 313 then issues one or more API calls via a client-side API 314 on behalf of the content units 313 to an RCP provider server 320 requesting links for recommended content from content sources 322-324 provided by the RCP.

The API calls include, at a minimum, for each content unit, the name of the corresponding content unit. Each API call may additionally include additional parameters which could include, without limitation, a URL for the webpage 311, a category (relating to the content of the webpage 311), a sub-category, keywords which may or may not relate to the content of the webpage, text objects on the webpage, media objects on the webpage, an identification of the user displaying the webpage and/or an identification of the website operator. In one embodiment, the RCP widget 312 makes a single API call referencing each of the content units 313 and their requested data. In one embodiment, the RCP widget 312 makes a separate API call for each of the content units 313.

An RCP provider server 320 receives the data provided by the client-side API 314 calls via a server-side API 321. The server 320 then uses the content module names received via the API 314 and 321 to look up weight configurations, content codes and content sources 322-324 (as described in detail above) for obtaining links relating to recommended content to be displayed by each of the user interface elements 314-316.

In one embodiment, the RCP server then returns link and link-related data relating to content recommended by the content sources 322-324 to the RCP widget via the server-side 321 and client-side 314 API interfaces. In one embodiment, the data returned to the RCP widget 314 identifies the content unit 313 for which it is intended. In one embodiment, the data returned to the RCP widget 314 is provided in a single stream of data comprising recommended links and link data for all of the content units 313.

In one embodiment, the RCP widget 312 then dynamically generates each of the user interface elements 314-316 using the content unit 313 corresponding to that user interface element and populates each user interface element with links received from the content sources 322-324 associated with that user interface element via its corresponding content unit. In an alternative embodiment, the user interface elements 314-316 are preexisting elements in the webpage 311 not generated by the RCP widget and the RCP widget populates each user interface element with links received from the content source associated with that user interface element via its corresponding content unit.

In one embodiment, results returned to the RCP widget 312 are displayed in the order they are returned to the widget, which can be, in turn, determined by the order of the content sources in the content codes associated with a given content unit 313. Alternatively, or additionally, in one embodiment, the RCP can provide configurations for dynamic content codes that specify which content code to use for each display position and can additionally provide other options, such as whether the output of a content code should be used in order or selected randomly. For example, one or more content codes can be associated with an ordinal number (e.g. 1, 2, 3 and so forth), and results returned to the RCP widget 312 associated with a given content code are displayed in an position corresponding to the content code's respective ordinal number.

In one embodiment, the fully populated user interface elements 314-316 can then be displayed on the webpage 311 to an end-user 317. Links can be displayed by the user interface elements 314-316 in any desired format now known or later to be developed in the art, including hyperlinks that can be selected by the end-user 317.

In one embodiment, in addition to calling the API and inserting the results received from the API into the webpage, the widget 312 can also provide a logging service which records both which links were displayed to the user and subsequently which links were traversed (clicked/followed) by the user. In one embodiment, such logging related data could be transmitted to and stored by the RCP service provider server 320 and later used by content sources 322-324 to fine-tune recommended content for specific users based on user's online behavior as described in detail below. In one embodiment, the click logging can also be implemented using standard click-tracking redirection.

Note that, in other implementations, API calls in the above process could be issued by the web server hosting the subject webpage 311 the time the webpage is served, as opposed to, for example, by the RCP widget 312 on the end-user device 310.

Web Server-Based Implementation

Figure 4:
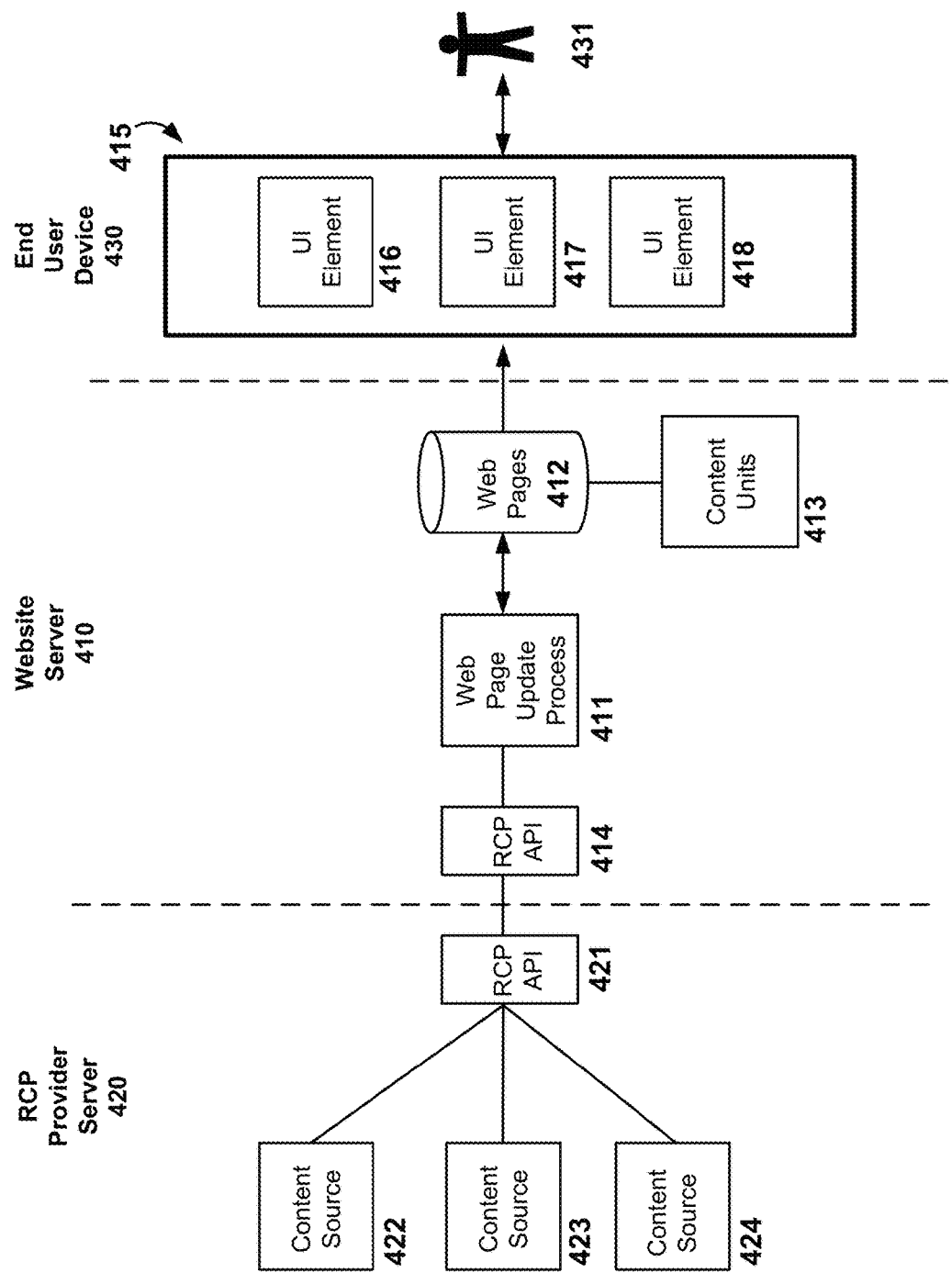
FIG. 4 illustrates one embodiment of the presentation of links for recommended content to a user using a web server-based implementation of an interface to a recommended content platform.

FIG. 4 illustrates one embodiment of the presentation of links for recommended content to a user using a web server-based implementation of an interface to an RCP.

Assume the owner of a website wishes to present three sets of links to recommended content on various positions of a webpage 415 of the website to a user 431, but also wishes to store such links embedded in the source code for the webpage on the website's servers. Source code for the webpage 412 is stored on a website server 410. The webpage includes content units 413 for at least three user interface elements 416-418 which are to be generated and/or populated with links relating to recommended content displayed on the webpage 415.

As in the case of the widget-based implementation discussed above, the content units 413 can define the format and position of each of the user interface elements 416-418 on the webpage 415, and additionally specifies a name for the content unit. In one embodiment, a webpage update process 411 references the content units 413 and identifies the names of the content units. The webpage update process 412 then issues one or more API calls via a client-side API 414 on behalf of the content units 413 to an RCP provider server 420 requesting links for recommended content from content sources 422-424 provided by the RCP.

The API calls include, at a minimum, for each content unit, the name of the corresponding content unit. Each API call may additionally include additional parameters which could include, without limitation, a URL for the webpage 415, a category (relating to the content of the webpage 411), a sub-category, keywords which may or may not relate to the content of the webpage, text objects on the webpage, media objects on the webpage, an identification of the user displaying the webpage and/or an identification of the website operator. In one embodiment, the webpage update process 412 makes a single API call referencing each of the content units 413. In one embodiment, the webpage update process 412 makes a separate API call for each of the content units 413 and their requested data.

An RCP provider server 420 receives the data provided by the client-side API 414 calls via a server-side API 421. In one embodiment, the content unit names referenced in such API calls are used by the RCP server 420 to look up weight configurations, content codes and content sources 422-424 associated with the content unit names (as described in detail above) for obtaining links relating to recommended content to be displayed by each of the user interface elements 414-416. The server 420 then retrieves link and link-related data for recommended content via content sources 422-424.

In one embodiment, the RCP server then returns link and link-related data retrieved by the content sources 422-424 to the webpage update process 412 via the server-side 421 and client-side 414 API interfaces. In one embodiment, the data returned to the webpage update process 412 identifies the content unit 413 for which it is intended. In one embodiment, the data returned to the webpage update process 412 is provided in a single stream of data comprising recommended links and link data for all of the content units 413.

In one embodiment, the webpage update process 412 then dynamically generates each of the user interface elements 414-416 using the content unit 413 corresponding to that user interface element and populates each user interface element with links received from the content sources associated with that user interface element via its corresponding content unit. In an alternative embodiment, the user interface elements 414-416 are preexisting elements in the webpage 411 not generated by the webpage update process 412 and the webpage update process populates each user interface element with links received from the content source associated with that user interface element via its corresponding content unit.

In one embodiment, results returned to the webpage update process 412 are displayed in the order they are returned to the widget, which can be, in turn, determined by the order of the content sources in the content codes associated with a given content unit 413. Alternatively, or additionally, in one embodiment, the RCP can provide configurations for dynamic content codes that specify which content code to use for each display position and can additionally provide other options, such as whether the output of a content code should be used in order or selected randomly. For example, one or more content codes can be associated with an ordinal number (e.g. 1, 2, 3 and so forth), and results returned to the webpage update process 412 associated with a given content code are displayed in an position corresponding to the content code's respective ordinal number.

In one embodiment, the source code for the webpage 412 is then updated to include fully populated user interface elements 416-418 where the links for recommended content are hard-coded in the webpage source 412. The webpage 415 can then be served to end-user devices 430 where links for recommended content are visible to end-users 431. Links can be displayed by the user interface elements 416-418 in any desired format now known or later to be developed in the art, including hyperlinks that can be selected by the end-user 431.

In one embodiment, the webpage update process 412 may be automatically executed on a periodic basis, for example, once per day, or may be executed in response to an event, for example, an update to the webpage source or an explicit request from the operator of the website.

Because search engine crawlers will see links hard-coded in webpage source 412, they will affect the link structure of the site as recorded and interpreted by search engines, potentially affecting the ranking of such pages. The RCP can thus be used to "sculpt Page Rank" as part of a search engine optimization strategy. In one embodiment, in this style of implementation the website server 410 is also responsible for logging which links are shown and which are clicked on—either by properly instrumenting the page in much the same way the RCP widget does, or by directly logging on the server-side. In the latter case, the impressions can be logged directly when the page is built, and standard click-tracking redirection can be used to log when the user clicks on links. In one embodiment, such logging related data could be transmitted to and stored by the RCP service provider server 420 and later used by content sources 422-424 to fine-tune recommended content for specific users based on user's online behavior as described in detail below.

Content Sources

As described above, in various embodiments, links to recommended content for a webpage are retrieved via content sources. In the most general sense, content sources represent components maintained on RCP servers that allow client processes to request links for recommended content from the RCP. Content sources can be thought of, in various embodiments, as "meta-algorithms" or algorithms that utilize combinations of algorithms that actually retrieve data. Such content sources may permit, or require, one or more parameters that may be used by the content source to select links for recommended content. Such parameters may include could include, without limitation, a URL for a webpage, a category (relating to the content of a webpage), a sub-category, keywords which may or may not relate to the content of a webpage, text objects on a webpage, media objects on a webpage, an identification of a website operator, a minimum number of links returned by the content source and/or a maximum number of links returned by the content source and the order of links returned by a content source to a content unit. In one embodiment, content sources each use one or more content recommendation algorithms to retrieve links for recommended content, described in detail below.

In one embodiment, where a content source is associated with a single content recommendation algorithm, the content source always uses that content algorithm to retrieve links to recommended content. In one embodiment, where a content source is associated with multiple content recommendation algorithms, the content source selects one of the content recommendation algorithms to retrieve links to recommended content. In one embodiment, where a content source is associated with multiple content recommendation algorithms, the content source selects one of the content recommendation algorithms randomly.

In one embodiment, a content source's use of content selection algorithms can be controlled using a number of content source options that could include: a weight for each content recommendation algorithm; an order of the use of content recommendation algorithm; and a minimum and/or maximum number of links to be chosen using each content recommendation algorithm.

In one embodiment, where a content source is configured to use multiple content recommendation algorithms that are weighted, the content recommendation algorithm used in a given page view could be the algorithm with the greatest weight. In one embodiment, where a content source is configured to use multiple content recommendation algorithms which are weighted and a content selection algorithm is selected randomly, such random selection could be biased by the weight assigned to each content recommendation algorithm.

In one embodiment, where a content source is configured to use multiple content recommendation algorithms that are weighted, the weights assigned to each multiple content recommendation algorithms could vary based on parameters input to the content source. For example, different weights could be assigned to algorithms based on, without limitation, an installation (e.g. a particular website or website provider), a category, a sub-category or keywords input to the content source. Thus, for example, a content source could choose different algorithms.

In one embodiment, where a minimum number of links is specified for a particular recommended content selection algorithm and the algorithm returns a number of links less than such minimum number the content source can take no action or, alternatively, can utilize another recommended content selection algorithm (e.g. a system or content source default algorithm) to select an additional number of links to meet the minimum number.

In one embodiment, where a maximum number of links is specified for a particular recommended content selection algorithm and the algorithm returns a number of links greater than such maximum number, a subset of links is randomly selected from the set of all links returned by the algorithm up to the maximum number of links allowed. Note that this can lead to different sets of links displayed on successive page views for the same content source.

In one embodiment, where a content source is associated with multiple content recommendation algorithms, the content source can use more than one of the algorithm to retrieve links for recommended content, and the links returned by the content source for a given page view represent a set of links comprising at least some links selected by each of the content recommendation algorithms used.

In one embodiment, where a content source is associated with multiple content recommendation algorithms, the content source uses all such algorithms to retrieve links for recommended content. In such embodiments, where each content recommendation algorithm is associated with a maximum number of links for each algorithm, the set of links output by the content source can be precisely tuned. For example, a content source could be configured to choose one recommendation using a first algorithm which chooses semantically related content from a first source, up to twenty recommendations using a second algorithm which chooses historically high-performing content items relative to a content item, and up to twenty recommendations using a third algorithm which content items semantically related to the current content item from a second source.

In one embodiment, where a content source is associated with multiple content recommendation algorithms, the content source could select a subset of the algorithms for retrieving links for recommended content. In various embodiments, a content source could select a subset of content recommendation algorithms using any of the techniques described above for selecting a single content selection algorithm. Examples include, without limitation, selecting two out of four algorithms randomly; selecting three out of five algorithms randomly biased by weight; and selecting four algorithms out of six having the greatest weight, where the weight of the algorithm varies by installation, category and/or sub-category.

In one embodiment, where a parameter input to a content source specifies a minimum number of links and the algorithms used by the content source return a number of links that is less than such minimum number, the content source can take no action or, alternatively, can utilize another recommended content selection algorithm (e.g. a system or content source default algorithm) to select an additional number of links to meet the minimum number.

In one embodiment, where a parameter input to a content source specifies a maximum number of links and the algorithm returns a number of links that is more than such maximum number, a subset of links is randomly selected from the set of all links returned by the algorithm up to the maximum number of links allowed. In one embodiment, where a parameter input to a content source specifies a maximum number of links and the algorithm returns a number of links that is more than such maximum number, the set of all links returned by the algorithms can be ordered, either by a default order or by an order specified by a parameter input to the content source, and truncated to select the maximum number of links allowed.

In one embodiment, where a parameter input to a content source specifies an order of links returned by a content source to a content unit, the links are ordered accordingly. In one embodiment, where no such parameter is specified, links are returned by the content source in the order they were selected by the content selection algorithms used by the content source.

Content Recommendation Algorithms

As described above, in various embodiments, content sources retrieve links to recommended content using content recommendation algorithms. In the most general sense, content recommendation algorithms represent components maintained on RCP servers that allow content sources to request links for recommended content from the RCP using a specific methodology and a specific data source or set of data sources. Such content recommendation algorithms may permit, or require, one or more parameters that may be used by the content recommendation algorithms to select links for recommended content. In one embodiment, parameters used by a content recommendation algorithm are received from a content source referencing the algorithm, which in turn receives the parameters from a content unit associated with a specific webpage.

In one embodiment, content recommendation algorithms can be conceptually divided into at least two classes, independent and dependent, based on the source of data they use. In one embodiment, independent content recommendation algorithms utilize parameters relating to a webpage to select content, but have no dependence on user interaction with such webpages. Such parameters could include, for example, a URL for a webpage (which, inter alia, permits the algorithm to access the content of the full webpage), a category, a sub-category, keywords or key phrases, text objects on a webpage and/or media objects on a webpage. In one embodiment, examples of independent algorithms are those that perform semantic matching of the content of a webpage to the content of other webpages. Additional examples are described below in the section labeled "Illustrative Content Recommendation Algorithms."

In one embodiment, dependent content recommendation algorithms additionally, or alternatively, utilize historical data relating to user interaction with, or to reaction to, webpages. Such data can be obtained from a variety of sources, including, for example, logs of user interaction data collected by an RCP or third-party websites. For example, user interaction data can include, without limitation, impressions, click-through-rate (CTR), subsequent-views-per-session (PV), ad clicks, ad clicks per session, revenue, revenue per session, and weighted views. In one embodiment, like independent algorithms, dependent content recommendation algorithms can also utilize parameters relating to a webpage to select content. Such parameters could include, for example, a URL for a webpage, a category, a sub-category, keywords or key phrases, text objects on a webpage and/or media objects on a webpage.

In one embodiment, dependent algorithms could include those that use direct user interaction data such as, for example, data relating to click-through-rate (CTR) or subsequent-sessions-per-view (SSPV) (e.g. for all, or a subset for all users). In one embodiment, dependent algorithms could include those that use historical session data (e.g. for all, or a subset for all users) to find recommended content. Such algorithms implement the idea that if a large number of users have visited a pair of content items in the same session, then other users viewing one of those content items may also want to view the other content item. In one embodiment, such sessions may be global to a website site, and therefore can encompass data collected before the RCP was launched as well as page views that occur due to link structures outside of the RCP, such as site navigation, search activity, and so forth. In one embodiment, dependent content recommendation algorithms could include those that use social data (e.g. "Likes" on the FACEBOOK social networking website or "Tweets" on the TWITTER social networking websites) to select recommended content. Additional examples are described below in the section labeled "Illustrative Content Recommendation Algorithms."

In one embodiment, newly published webpages, for which no historical data is available, can utilize independent content recommendation algorithms for their initial recommendations. As users interact with such webpages, the dependent content recommendation algorithms can then be utilized to provide recommendations.

In one embodiment, independent and dependant content recommendation algorithms can be further conceptually divided into at least two additional classes based on their context: attached and detached. In one embodiment, detached content recommendation algorithms are not tied to any particular webpages or page/position combinations. Examples include a list of articles relating to current events, or popular topics, or the like. In one embodiment, such lists may be most relevant for a certain set of articles such as, for example, all articles in a specific category.

In one embodiment, attached algorithms, on the other hand, generate recommendations based on a particular webpage or page/position combination. Typical examples include semantic matching algorithms, page-level optimization algorithms, etc. Semantic algorithms generally operate at the webpage-level, while optimization algorithms may operate at the webpage/position level.

Illustrative Independent Content Recommendation Algorithms

Additional illustrative examples of content recommendation algorithms include those listed immediately below. It should be understood that these examples are not intended to be limiting, and that other content recommendation algorithms now known, or later to be developed, could be integrated into an RCP, and are within the scope of the disclosure.

Illustrative Independent Content Recommendation Algorithms

SOLR—Utilizes a full text index relating to content in a content database composed of the title of the content, the first section of the content, the category, sub-category, and sub-sub-category of the article.

CME2—Similar to SOLR, but does not use taxonomy data in the index, and uses both stemmed and unstemmed keywords from other fields in the content.

CME2TitleSummary—A variation of CME2 that uses the title of content plus a summary of the content to form a matching query.

CME2TitleBestMatch—A variation of CME2 that implements an inbound link limit to produce an approximately balanced link graph and only utilizes the title of the content.

CME2TitleSummaryBestMatch—A variation of CME2TitleBestMatch that uses the summary of the content as well as title of the content.

CME2T-4mo—A variation of CME2 that only contains articles published in the last four months.

CME2Dedupe—A variation of CME2 that adds fuzzy deduping to reject titles that are too similar to the source title or to other titles in the result set. Provides a similarity score based on cosine-similarity of TF-IDF weighted term vectors.

LSI—Utilizes latent semantic indexing that uses the entire text of individual content items compared to the entire text of every content item.

WinksTitles—Choose content items whose title is found in the body of the source item's content.

WinksGoogleArticles—Choose content items where a search phrase that has referred traffic to the destination article is found in the body of the source item's content.

Illustrative Dependent Algorithms (Session Data)

ContentNext—Chooses the content items appearing most frequently immediately after a source content item over the past seven months of session data.

AllNextSteps—Chooses content items appearing most frequently after a source content item.

PrevSteps—Chooses content items appearing the most frequently immediately before a source content item.

WeightedSteps—Chooses the content items appearing most frequently in the same session a source content item, but weighted based on the distance from the source content item.

MLR—Machine Learning Ranking that uses a large set of features to predict click-through rate, including presence of specific words, parts of speech tags, and traffic history.

Illustrative Dependent Algorithms (CTR)

ContentYield2—Aggregates the total impressions and clicks for each pair of content items over a rolling 60-day window and chooses the articles with the highest click-through rate.

CoalesceCTR—Calculates the aggregate click-through rate for each destination URL over the past 60 days regardless of what pages the content item was shown on. Then, for each source content item, it chooses the destination content items recommended by other algorithms for the page with the highest global click-through rate.

BirdsOfaFeather—Apply learnings from related content to a URL that is new to the system. First, related content for the URL is identified by the CME2 algorithm. Next, the ContentYield2 sets for each of the related URLs are grouped together, and those with the highest aggregate click-through rate are selected.

Illustrative Dependent Algorithms (Social Data)

FacebookLikes—Chooses the content items within the same category that have the most "Likes" on the FACEBOOK social networking site.

Personalization

In one embodiment, an RCP can additionally provide functionality for personalizing recommended content for individual users. The goal of personalization is to recommend content based on a "persona" rather than (or in addition to) the contents of the current page in order to provide a more relevant, targeted user experience.

In one embodiment, a "persona" can be defined as a set of traffic attributes (geography, historical click behavior, sociographic information, demographic information, etc) that correlate with a desired pattern of user behavior (e.g. high likelihood of clicking on ads in a specific category).

In one embodiment, personas can be created by clustering traffic data acquired and warehoused using the RCP. In one embodiment, such clusters can be defined based on user IDs by associating measurable facts about each request with desired outcomes. In one embodiment, personas may overlap—a user IDs may fall into multiple personas. In one embodiment, personas need not be defined with the same set of facts. The only requirement for a persona is that the behavior of users within it differs in some useful way from the behavior of other users. In one embodiment, persona clusters can be built offline on a periodic basis. In one embodiment, the RCP could deliver one or more sets of recommended content for each persona. Such recommended content could be a solely a function of the persona, or may also be a function of the site, category, or webpage.

In one embodiment, when a request comes into the RCP, personas in a persona database are checked to see if the user ID for the user visiting the webpage matches one or more personas. If so, the recommended content sets associated with that persona will be added to the list of recommended content sets available to content sources via, for example, an algorithm for selecting recommended content associated with selected personas.

An Illustrative System and Network Implementation

Figure 5:
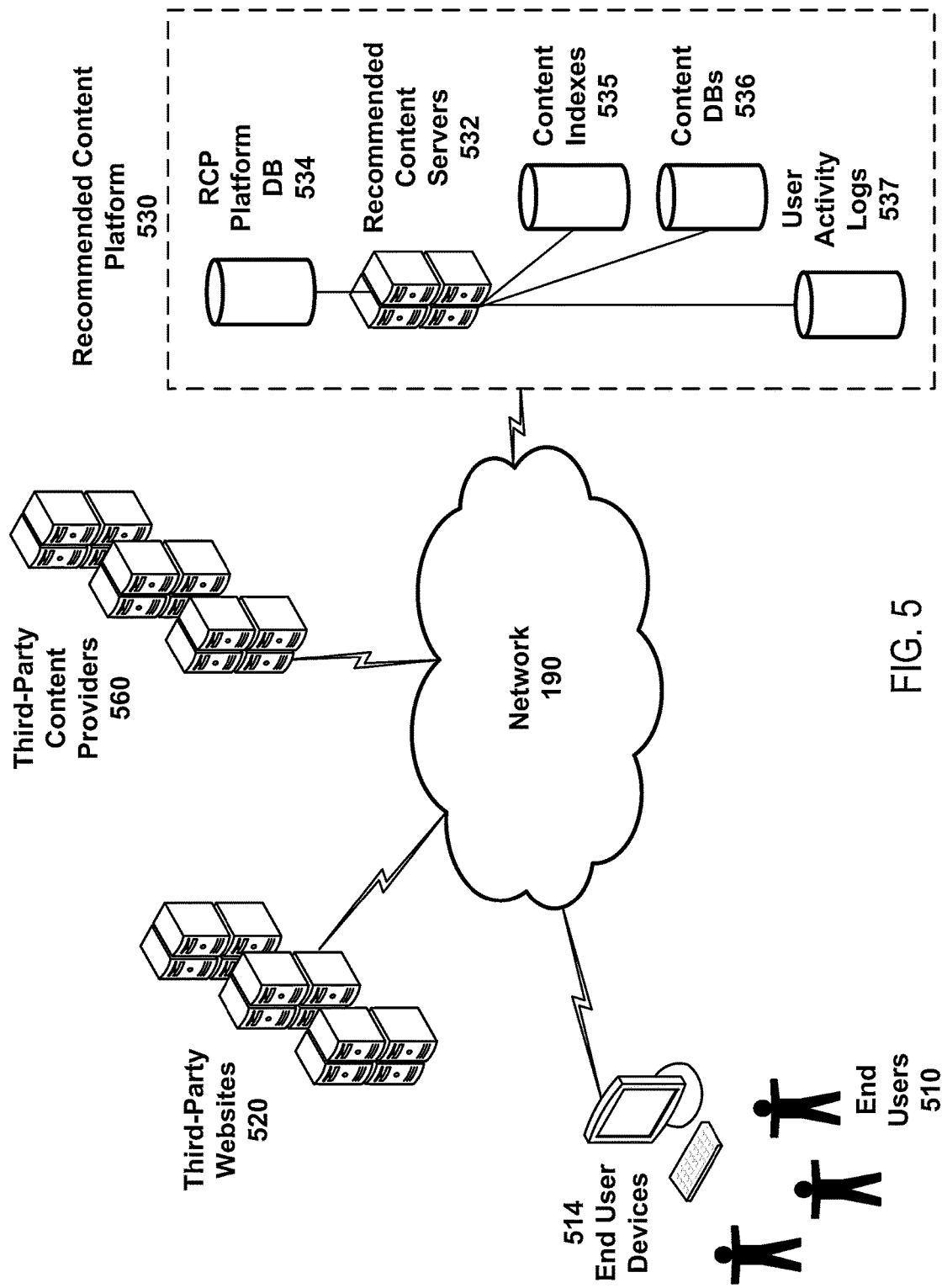
FIG. 5 illustrates a high-level view of components of one embodiment of systems and networks for implementing a recommended content platform and provide recommended content services to websites and end-users.

FIG. 5 illustrates a high-level view of components of one embodiment of systems and networks for implementing a recommended content platform and provide recommended content services to websites and end-users.

In one embodiment, end-users 510 access various third-party 520 websites over a network 590 such as the Internet. Such third-party 520 websites could comprise any type of website of interest to the users such as, for example, news websites, topical websites and social networking websites. In one embodiment, one or more webpages within such websites 520 include an RCP widget and one or more content units that define the format and position of user interface elements for displaying links to recommended content as well as content source for such links.

In one embodiment, when a user 510 displays a webpage from a third-party website 520 including an RCP widget and one or more content units, the widget requests links, over the network 190, for recommended content from content sources hosted by a recommended content platform 530. In one embodiment, the definitions for content sources are stored on one or more RCP platform databases 534. In one embodiment, definitions for content sources include, inter alia, one or more content recommendation algorithms for identifying links to recommended content. In one embodiment, content recommendation algorithms are hosted by the recommended content platform 530, and the definitions for such algorithms are stored on one the RCP platform databases 534

In one embodiment, a recommended content server 532 then receives the request for recommended content from the widget, over the network 590, and identifies links for recommended content using the content sources referenced in the request. Links to recommended content are retrieved by the referenced content sources using the content recommendation algorithms associated with the content source.

The identified links are then transmitted back to the widget executing on the end-user device 514 from which the request originated. In one embodiment, requests for recommended content and the response to such requests are transmitted using an API implemented on the end-user device 514 and the recommended content server 532.

The content recommendation algorithms hosted on the recommended content servers 532 utilize a variety of methodologies for identifying recommended content. Independent algorithms identify content based solely on the content of the webpage from which a request for recommended content was issued. For example, such algorithms can utilize content indexes 535 of various types such as, for example, a full text index relating to content in a content database 536 or content provided by one or more third-party content providers 560. Such algorithms can additionally or alternatively, utilize the entire text of text index relating to content in a content database 536 or content provided by one or more third-party content providers 560.

In one embodiment, Dependent algorithms utilize historical data relating to user interaction with, or to reaction to, webpages to identify recommended content. Such historical data could include user activity logs 527 comprising, inter alia, user activity tracked by the recommended content platform 530 by RCP widgets or user activity tracked by third-party websites 520 and reported to the recommended content platform.

When the widget executing on the end-user device 514 receives links for recommended content relating to one or more content units in a webpage from a third-party website 520, the widget renders user interface elements associated with the content units, populates the user interface elements with the applicable links to recommended content and displays the user interface elements to the user in the position in the webpage In one embodiment, the provider of a third-party website 520 may elect to embed links to recommended content directly in webpages of its website as they are stored on the website, rather than via an RCP widget. In such embodiments, one or more webpages of the website 520 include one or more content units, but do not include an RCP widget. In one embodiment, the website 520 requests, over the network 190, links for recommended content relating to content units embedded in the website's webpages from content sources hosted by the recommended content platform 530. The requests are processed in the same manner as those issued by RCP widgets discussed above, and sets of links to recommended content received from the recommended content platform 530 are then embedded directly in the webpages of the website 520 where the updated webpages can be accessed by end-users 510 and other third-party website 520, for example, web search services such as GOOGLE. In various other embodiments, the system can supports implementations consisting of a combination of widgets and server-side implementations.

Figure 6:
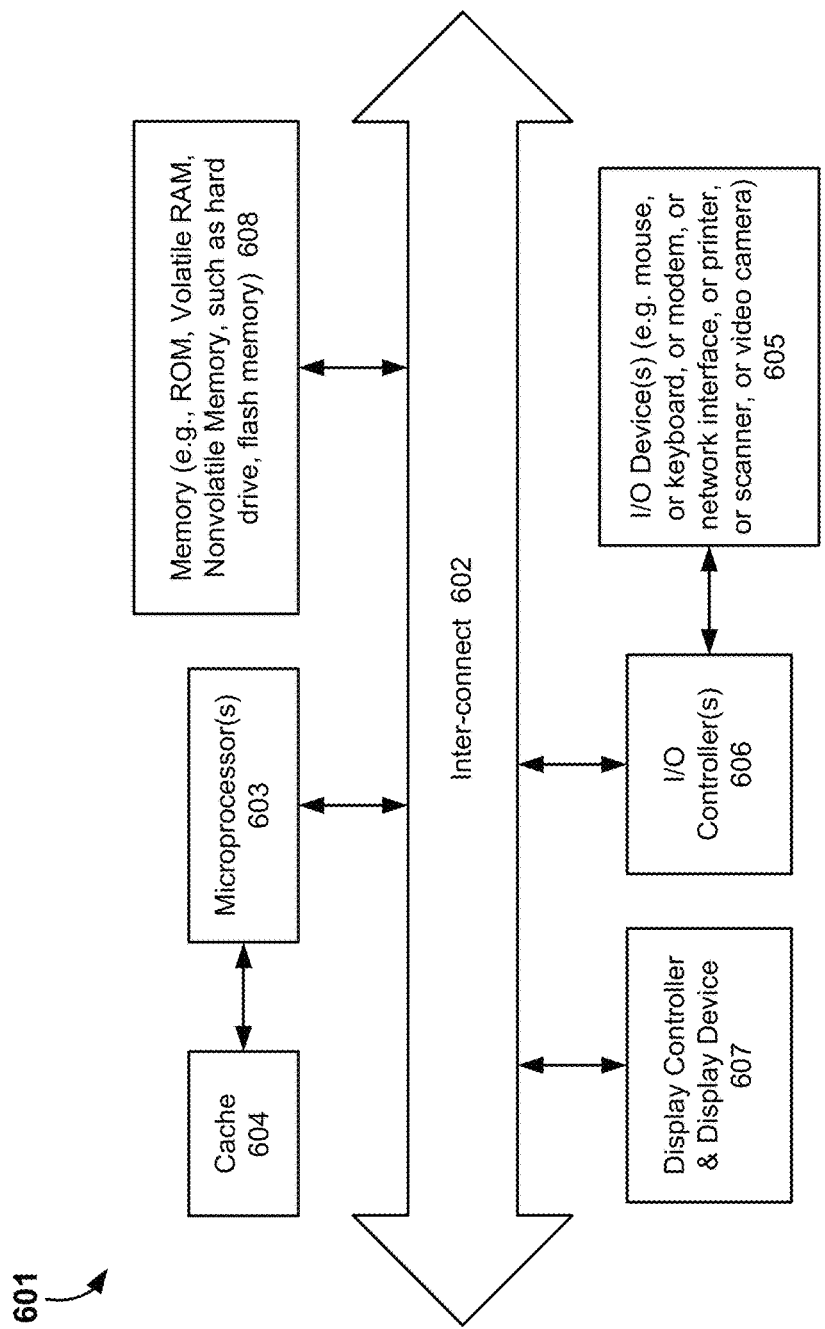
FIG. 6 shows a block diagram of a data processing system that can be used in various embodiments of the present disclosure.

FIG. 6 shows a block diagram of a data processing system that can be used in various embodiments of the present disclosure. While FIG. 6 illustrates various components of a computer system, it is not intended to represent any particular architecture or manner of interconnecting the components. Other systems that have fewer or more components may also be used.

In FIG. 6, the system 601 includes an inter-connect 602 (e.g., bus and system core logic), which interconnects a microprocessor(s) 603 and memory 608. The microprocessor 603 is coupled to cache memory 604 in the example of FIG. 6.

The inter-connect 602 interconnects the microprocessor(s) 603 and the memory 608 together and also interconnects them to a display controller and display device 607 and to peripheral devices such as input/output (I/O) devices 605 through an input/output controller(s) 606. Typical I/O devices include mice, keyboards, modems, network interfaces, printers, scanners, video cameras and other devices that are well known in the art.

The inter-connect 602 may include one or more buses connected to one another through various bridges, controllers and/or adapters. In one embodiment the I/O controller 606 includes a USB (Universal Serial Bus) adapter for controlling USB peripherals, and/or an IEEE-1394 bus adapter for controlling IEEE-1394 peripherals.

The memory 608 may include ROM (Read-Only Memory), and volatile RAM (Random Access Memory) and non-volatile memory, such as hard drive, flash memory, etc.

Volatile RAM is typically implemented as dynamic RAM (DRAM) that requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 6 is used to implement the recommended content servers 532 of FIG. 5 and/or other servers.

In one embodiment, a data processing system as illustrated in FIG. 6 is used to implement an end-user device 514 of FIG. 5. An end-user may be in the form of a personal digital assistant (PDA), a cellular phone, a notebook computer, a laptop computer, or a personal desktop computer.

In some embodiments, one or more servers of the system can be replaced with the service of a peer-to-peer network of a plurality of data processing systems, or a network of distributed computing systems. The peer-to-peer network, or a distributed computing system, can be collectively viewed as a server data processing system.

Embodiments of the disclosure can be implemented via the microprocessor(s) 603 and/or the memory 608. For example, the functionalities described can be partially implemented via hardware logic in the microprocessor(s) 603 and partially using the instructions stored in the memory 608. Some embodiments are implemented using the microprocessor(s) 603 without additional instructions stored in the memory 608. Some embodiments are implemented using the instructions stored in the memory 608 for execution by one or more general-purpose microprocessor(s) 603. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, ROM, RAM, flash memory devices, floppy and other removable disks, magnetic disk storage media, optical storage media (e.g., Compact Disk ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
receiving, over a network, a request for recommended content from a requester, the request comprising a content unit, the content unit being associated with a respective plurality of content sources, each respective content source comprising a respective content recommendation methodology and at least one respective data source, wherein the respective content source identifies links to recommended content items by applying the respective content recommendation methodology to the at least one respective data source, wherein the respective content recommendation methodology comprises multiple algorithms selected using a weighting factor based on at least one of installation, category, or sub-category, a first algorithm of the algorithms to be selected for retrieving the links based on at least one respective input parameter included in the request, the at least one respective input parameter specifying a minimum number of links to be chosen using the first algorithm and a maximum number of links to be chosen using a second algorithm of the algorithms, and wherein the content unit defines the format and position of a user interface element on a webpage, the user interface element to be generated for display of recommended content on the webpage;
selecting, using a computing device, one content source of the plurality of content sources;
identifying, using the computing device, a plurality of links to recommended content items accessible over the network using the one content source of the plurality of content sources, wherein the plurality of links is retrieved from the first algorithm;
determining that a number of links returned by the one content source is less than the minimum number;
in response to determining that the number of links returned by the one content source is less than the minimum number, utilizing the second algorithm to select an additional number of links to meet the minimum number;
determining that the additional number of links is greater than the maximum number;
in response to determining that the additional number of links is greater than the maximum number, randomly selecting a subset of the links returned by the second algorithm; and
transmitting, over the network, in accordance with the maximum number of links, the plurality of links to recommended content items to the requester.

2. The method of claim 1 wherein the one content source of the plurality of content sources is selected randomly.

3. The method of claim 1 wherein the at least one respective input parameter comprises at least one of an installation, a category, a subcategory, or keyword.

4. The method of claim 1 wherein the first algorithm is a dependent algorithm, such that the respective at least one data source associated with the first algorithm comprises data relating to user interaction with at least one webpage and the respective content recommendation methodology associated with the first algorithm identifies links to recommended content items based, at least in part, on the data relating to user interaction with at least one webpage.

5. The method of claim 4 wherein the data relating to user interaction with at least one webpage comprises at least one of: click-through-rate (CTR), subsequent-views-per-session (PV), ad clicks, ad clicks per session, revenue, revenue per session, or weighted views.

6. The method of claim 1 wherein the first algorithm is an independent algorithm, such that the respective content recommendation methodology associated with the first algorithm identifies links to recommended content items based on data that does not include data relating to user interaction with webpages.

7. The method of claim 1 wherein the request additionally comprises an identification of a webpage, and wherein the first algorithm is an attached algorithm, such that the respective content recommendation methodology associated with the first algorithm identifies links to recommended content items based on, at least in part, the identification of a webpage.

8. The method of claim 1 wherein the request additionally comprises an identification of a webpage, and wherein the first algorithm is a detached algorithm, such that the respective content recommendation methodology associated with the first algorithm does not identify links to recommended content items using the identification of a webpage.

9. The method of claim 1 wherein the request additionally comprises an order for links to recommended content, wherein the plurality of links to recommended content items is transmitted, over the network, to the requester in the order for links to recommended content.

10. A method comprising:
receiving, over a network, a request for recommended content from a requester, the request comprising a content unit, the content unit comprising a plurality of content sources, each respective content source comprising a respective content recommendation methodology and at least one respective data source, wherein the respective content source identifies links to recommended content items by applying the respective content recommendation methodology to the at least one respective data source, wherein the respective content recommendation methodology comprises multiple algorithms selected using a weighting factor based on at least one of installation, category, or sub-category, a first algorithm of the algorithms to be selected for retrieving the links based on at least one respective input parameter included in the request, the at least one respective input parameter specifying a minimum number of links to be chosen using the first algorithm and a maximum number of links to be chosen using a second algorithm of the algorithms, wherein the content unit defines the format and position of at least one user interface element on a webpage, the at least one user interface element to be generated for display of recommended content on the webpage;
for each respective content source of the plurality of content sources,
identifying, using the computing device, a respective plurality of links to recommended content items accessible over the network using the respective content source, wherein the respective plurality of links is retrieved from the first algorithm, determining that a number of links returned by the respective content source is less than the minimum number, in response to the determining, utilizing the second algorithm to select an additional number of links to meet the minimum number, determining that the additional number of links is greater than the maximum number, in response to determining that the additional number of links is greater than the maximum number, randomly selecting a subset of the links returned by the second algorithm, aggregating, using the computing device, the respective plurality of links into an aggregated plurality of links to recommended content items, and transmitting, over the network, in accordance with the maximum number of links, the aggregated plurality of links to recommended content items.

11. The method of claim 10 wherein:

a first content source of the plurality of content sources comprises a dependent algorithm, such that the respective at least one data source associated with the first content source comprises data relating to user interaction with at least one webpage and the respective content recommendation methodology associated with the first content source identifies links to recommended content items based, at least in part, the data relating to user interaction with at least one webpage, and a second content source of the plurality of content sources comprises an independent algorithm, such that the respective content recommendation methodology associated with the second content source identifies links to recommended content items based on data that does not include data relating to user interaction with webpages.

12. A non-transitory machine readable media embodying instructions for a widget embedded in a webpage, the instructions causing a data processing system to:

identify a plurality of content units within the webpage, each content unit of the plurality of content units comprising a respective definition of a user interface element and a respective content source for retrieving links to recommended content from a server, wherein each respective content source is associated with multiple content recommendation algorithms selected using a weighting factor based on at least one of installation, category, or sub-category, and selects a first algorithm of the algorithms to retrieve the links based on at least one respective input parameter, the at least one respective input parameter specifying a minimum number of links to be chosen using the first algorithm and a maximum number of links to be chosen using a second algorithm of the algorithms;

generate a request for recommended content, the request comprising, for each content unit of the plurality of content units, an identification of the respective content unit, the respective content source associated with the respective content unit, and the at least one respective input parameter;

transmit, over a network, the request for recommended content to the server;

receive, over the network, a plurality of links to recommended content items comprising at least one respective link for each content unit of the plurality of content units, wherein the at least one respective link is retrieved from the first algorithm, wherein the plurality of links further comprises a subset of an additional number of links selected utilizing the second algorithm in response to a determination by the server that a number of links returned by the respective content source is less than the minimum number, and wherein in response to a determination that the additional number is greater than the maximum number, the subset is randomly selected from links returned by the second algorithm;

generate, for each of the plurality of content units, a respective one user interface element of a plurality of user interface elements using the respective definition of the user interface element of the respective content unit of the plurality of content units, wherein the respective one user interface element is populated, subject to the maximum number of links, with the respective at least one respective link for the respective content unit;

display each user interface element of the plurality of user interface elements on a display device in association with a display of the webpage.

13. A computer system comprising:

a storage device storing respective source code for each of a plurality of webpages;

a memory; and at least one processor coupled to the memory to:

for each webpage of the plurality of webpages, identify a respective plurality of content units within the respective source code for the respective webpage, each content unit of the respective plurality of content units comprising a respective definition of a user interface element and a respective content source for retrieving links to recommended content from a server, wherein the respective content source is associated with multiple content recommendation algorithms selected using a weighting factor based on at least one of installation, category, or sub-category, and the respective content source selects a first algorithm of the algorithms to retrieve the links based on at least one respective input parameter, the at least one respective input parameter specifying a minimum number of links to be chosen using the first algorithm and a maximum number of links to be chosen using a second algorithm of the algorithms;

generate a request for recommended content, the request comprising, for each content unit of the respective plurality of content units, an identification of the respective content unit, the respective content source associated with the respective content unit, and the at least one respective input parameter;

transmit, over a network, the request for recommended content to the server;

receive, over the network, a plurality of links to recommended content items comprising at least one respective link for each content unit of the respective plurality of content units, wherein the plurality of links further comprises a subset of an additional number of links selected utilizing the second algorithm in response to a determination by the server that a number of links returned by the respective content source is less than the minimum number, and wherein in response to a determination that the additional number is greater than the maximum number, the subset is randomly selected from links returned by the second algorithm;

generate, for each of the respective plurality of content units, a respective one user interface element of a respective plurality of user interface elements using the respective definition of a user interface element of the respective content unit of the plurality of content units, wherein the respective one user interface element is populated, subject to the maximum number of links, with the respective at least one respective link for the respective content unit;

update the respective source code for the respective webpage on the storage device to insert the respective plurality of user interface elements into the respective source code.

14. The method of claim 1 wherein the at least one respective input parameter comprises a text object on the webpage, or a keyword.

15. The method of claim 1 wherein:

the at least one respective input parameter does not include data relating to user interaction with a webpage, and the first algorithm is an independent algorithm; and the method further comprising, after user interaction with at least one webpage, identifying links to recommended content items based, at least in part, on data relating to the user interaction with the at least one webpage.

16. The method of claim 1 wherein an additional parameter in the request specifies an order of links to be returned by the one content source of the plurality of content sources.

17. The method of claim 1 wherein the request further comprises a URL for a webpage and a category used in combination by a content source to select links.

* * * * *